3,361,622
COMPOSITIONS AND METHODS FOR REPELLING INSECTS WITH DIAMINO SULFENES
Lyle D. Goodhue, Bartlesville, Okla., assignor to Phillips Petroleum Company, a corporation of Delaware
No Drawing. Filed Sept. 23, 1963, Ser. No. 310,902
10 Claims. (Cl. 167—22)

ABSTRACT OF THE DISCLOSURE

Compounds of the general formula

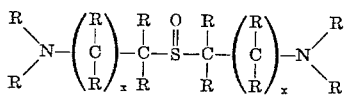

wherein $x$ is a whole integer from 0 to 3, and each R is selected from the group consisting of hydrogen and alkyl radicals having from 1–4 carbon atoms, are used as insect repellents. These compounds can be mixed with a liquid or solid carrier and applied to a locus to repel insects.

This invention relates to combatting insects. In one aspect this invention relates to compounds which repel insects. In another aspect this invention relates to method and composition for combatting insects.

The presence of insects in certain areas creates problems of dirt and uncleanliness, disease breeding, unpleasant and unattractive surroundings, and material damage caused by the insects. In the constant warfare being waged against insects, various methods have been employed for ridding areas of insects. Much research work has been devoted to the development of repellents and insecticides for various species of insects, particularly roaches, for use in control of such insects. In many cases insecticides are chosen when it is desired to kill the insect and completely rid an area, such as a house, of the insects. One widely used type of insecticides are the insect stomach poisons which are administered by placing them on food such as sugar so that, when the insect consumes the sugar as food, the poison kills the insect. However, it is quite dangerous to employ such a method in many instances as many of the insect poisons are also toxic to humans and other animals, and many children and household pets have been affected by merely eating the food treated with the poisons. On the other hand, it is often more desirable to employ repellents, particularly when dealing with roaches, and particularly in such locations as restaurants and stores where the sight of roaches has a definite effect on the customer. In such instances, it is preferred to employ a repellent compound which will serve to prevent or deter the insect from frequenting a particular location rather than an insecticide which will kill the insect at the location.

Therefore, it is an object of this invention to provide new insect repelling compositions. It is another object of this invention to provide an improved method for repelling insects from a particular location. It is still another object of this invention to provide composition and method for repelling insects. Other objects and advantages will be apparent to one skilled in the art upon further reading this disclosure of invention and appended claims.

I have discovered that compounds of the general formula

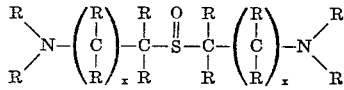

wherein each $x$ is a whole integer from 0 to 3, and each R is selected from the group consisting of hydrogen and alkyl radicals having from 1–4 carbon atoms are effective to repel insects, particularly roaches.

Further in accordance with this invention, insects, such as roaches, are combatted by applying one of the above compounds to a locus from which it is desired to prevent insects from frequenting.

Some examples of compounds of the above general formula which can be employed as roach repellents are: bis(3-[N,N-dimethylamino]propyl) sulfoxide; bis(2-aminoethyl) sulfoxide; 2-(N-ethylamino) ethyl 3-(N-isopropylamino) propyl sulfoxide; bis(4-[N,N-di-n-butylamino] butyl) sulfoxide; bis(4-[N,N-diethylamino]octyl) sulfoxide; 2-(N-methylamino)hexyl 3-(N-tert-butylamino) butyl sulfoxide; bis(aminomethyl) sulfoxide; bis(1,1,2-trimethyl-2-[N,N-dimethylamino]propyl) sulfoxide, and the like.

The repellent compounds of this invention can be applied to the desired locus by conventional carriers which are inert to the compound such as solutions, emulsions, dusts, wettable powders, aersosols, and the like. Solid inert carrier materials such as talc, kieselguhr, and the like, are employed when preparing powders. Solvents which can be employed include such materials as naphtha, kerosene, toluene, cyclohexanone, acetone, and the like. Generally, the solvent employed will boil above atmospheric temperatures. One particularly effective solvent which can be used is an isoparaffinic hydrocarbon boiling in the approximate range of 260–800° F. which is sold under the trademark of Soltrol and usually produced by the HF alkylation of an isoparaffin with an olefin.

The amount of repellent compound used in solutions, emulsions, etc., can vary over a wide range, but will generally be within the range of from 0.05 to 60 percent by weight. In some instances even lower concentrations can be used while the upper limit is dictated primarily by economics.

When applying the repellent compounds of this invention to a locus to which is it desired to repel insects, such as roaches, the method of application will be chosen so as to deposit from 0.01 to 50 grams per 100 square feet of area.

The repellent compounds of this invention can be used in admixture with other repellent compounds for preparing general insect repellent compounds.

The following specific example is presented to illustrate the advantages of the compounds of this invention as roach repellents. It is not intended to limit the invention to the specific insect, compounds, and concentrations shown in the example.

Example

A test was carried out in which a sulfoxide compound was tested as a repellent for roaches.

The test was conducted in a screen covered 8" x 8" x 12" clear plastic cage containing approximately 1000 German roaches. File cards, 3" x 5", previously treated by dipping in acetone and a 50 weight percent acetone solution of a sulfoxide, respectively, and dried were placed in the cage so as to lean against the sides thereof. The number of roaches on each card were then determined at various time intervals. The results of this test are expressed in the following table:

ROACHES ON CARD AFTER X HOURS

| Compound | 1 hr. | 2 hr. | 3 hr. | 4 hr. | 5 hr. | 6 hr. | 24 hr. |
|---|---|---|---|---|---|---|---|
| Bis(3-[N,N-dimethylamino]propyl) sulfoxide | 13 | 4 | 0 | 0 | 0 | 1 | 2 |
| Control (acetone) | 310 | 309 | 312 | 197 | 204 | 210 | 241 |

I claim:
1. A method of repelling insects from a locus which comprises applying to said locus an effective repelling amount of a compound having the formula

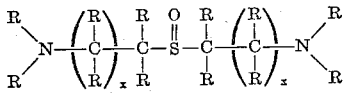

wherein each $x$ is a whole integer from 0 to 3, and each R is slected from the group consisting of hydrogen and alkyl radicals having from 1–4 carbon atoms.

2. The method of claim 1 wherein said compound is applied to said locus in a hydrocarbon solvent which boils above atmospheric temperature.

3. The method of claim 1 wherein said compound is applied to said locus with a carrier powder.

4. The method of claim 1 wherein the compound is bis(3[N,N-dimethylamino]propyl) sulfoxide.

5. A method of repelling insects from a locus which comprises applying to said locus in an amount of from 0.01 to 50 grams per 100 square feet a compound having the formula

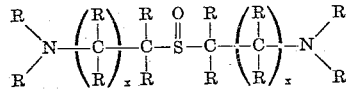

wherein each $x$ is a whole integer from 0 to 3, and each R is selected from the group consisting of hydrogen and alkyl radicals having from 1–4 carbon atoms.

6. The method according to claim 4 wherein said insects comprise roaches.

7. A composition for repelling insects comprising 0.05 to 60 percent by weight of a compound of the formula

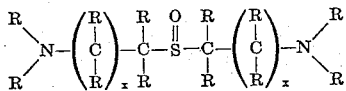

wherein each $x$ is a whole integer from 0 to 3, and each R is selected from the group consisting of hydrogen and alkyl radicals having from 1–4 carbon atoms, and the remainder an inert solid carrier.

8. A composition according to claim 7 wherein said insects are roaches, said compound is bis(3[N,N-dimethylamino]propyl) sulfoxide, and said carrier is selected from the group consisting of talc and kieselguhr.

9. A composition for repelling insects comprising 0.05 to 60 percent by weight of a compound of the formula

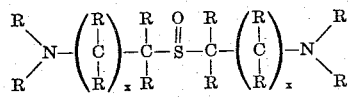

wherein each $x$ is a whole integer from 0 to 3, and each R is selected from the group consisting of hydrogen and alkyl radicals having from 1–4 carbon atoms, and the remainder a carrier comprising a hydrocarbon solvent which boils above atmospheric temperature.

10. A composition according to claim 9 wherein said insects are roaches and said compound is bis(3[N,N-dimethylamino]propyl) sulfoxide.

References Cited

Barnett, J. Chem. Soc., pp. 5–8 (1944).
Leonard and Johnson, J. Org. Chem. 27, p. 283 (1962).

ALBERT T. MEYERS, *Primary Examiner.*

S. FRIEDMAN, *Assistant Examiner.*